Jan. 14, 1930. E. JAHN 1,743,714
MACHINE FOR WORKING WOOD AND OTHER MATERIALS
Filed May 3, 1926  6 Sheets-Sheet 4

Inventor
Eugene Jahn
By Williamson Atty.

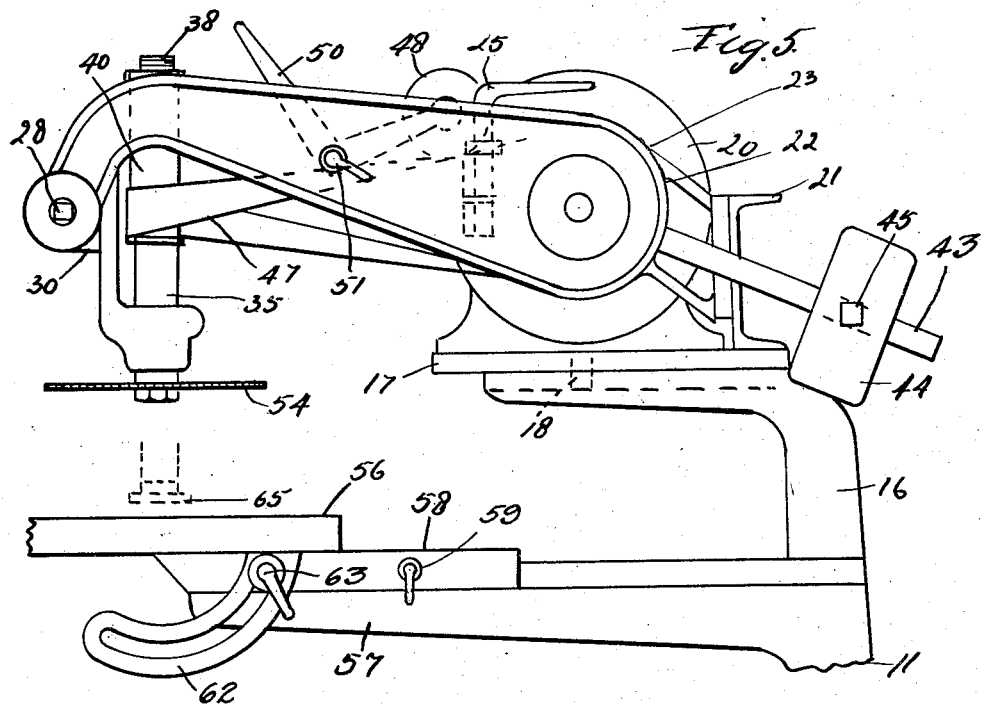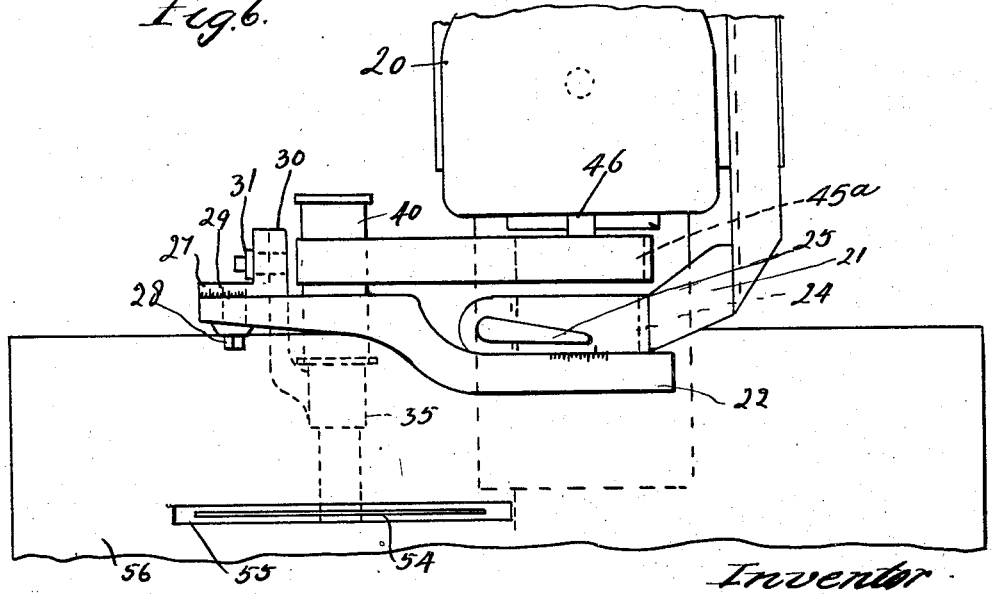

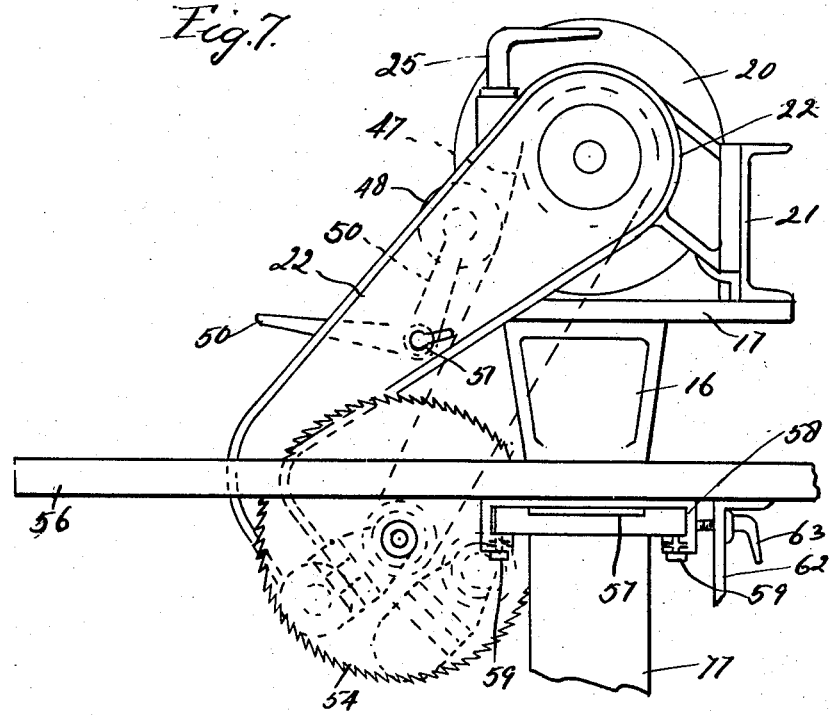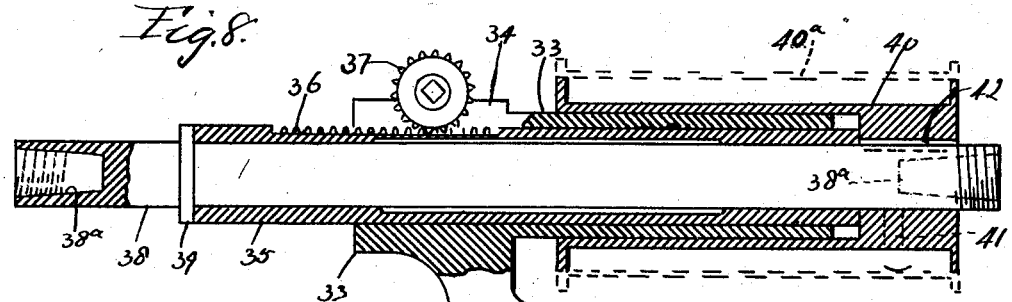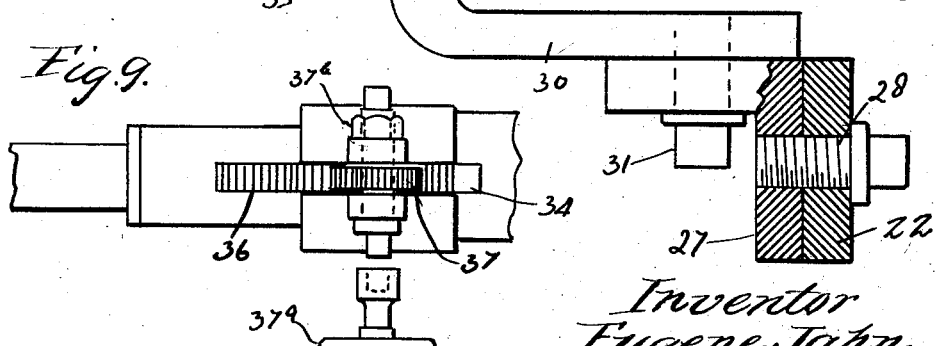

Patented Jan. 14, 1930

1,743,714

UNITED STATES PATENT OFFICE

EUGENE JAHN, OF PHILADELPHIA, PENNSYLVANIA

MACHINE FOR WORKING WOOD AND OTHER MATERIALS

Application filed May 3, 1926. Serial No. 106,409.

My invention relates to new and useful improvements in machines for working wood and other materials, and has for its primary object to provide a simple and effective machine of this description for accomplishing the various operations necessary or convenient in a wood-working or similar shop, such as cross cutting, rip sawing, swing sawing, dadoing, scoring, mitering, shaping, planing, boring, etc.

A further object of my invention is to so mount the driving motor or other driving apparatus upon the machine that it may be rotated on its mounting, carrying with it an adjustable tool arm, and among the other objects of the invention is to provide a rotary tool shaft with pulley adjustable in the direction of its axis, the bearings of said tool shaft being mounted by a universally adjusting angle block to a swinging arm, the center of motion of said swinging arm being in or near the center of motion of the driving pulley or a suitable motor or other driving apparatus, the support to which the swinging arm is pivoted being mounted upon the motor base, said base being swivelled in order that it may be turned and held in any adjustment at right angles to the motion of the swinging arm; thus providing for moving the tools to and from the work or, when desirable, to move the work to and from the tools.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a front elevation of the machine.
Fig. 2, is a side elevation of Fig. 1.
Fig. 3, is a plan view.
Fig. 4, is a view similar to Fig. 2, illustrating the use of the machine for swing sawing.
Fig. 5, illustrates the machine adjusted for use in shaping, spotting and drilling at any angle or degree.

Fig. 6, is a plan view of a portion of the machine showing the saw adjusted for use in ripping.

Fig. 7, is a front view of Fig. 6.

Fig. 8, is a sectional view on an enlarged scale of the tool shaft box bearing.

Fig. 9, is a plan view of a portion of Fig. 8.

Fig. 10, is an elevation of the motor showing its base mounted upon a sliding carriage.

Fig. 11, is a section at 11—11 of Fig. 10.

Figure 1:
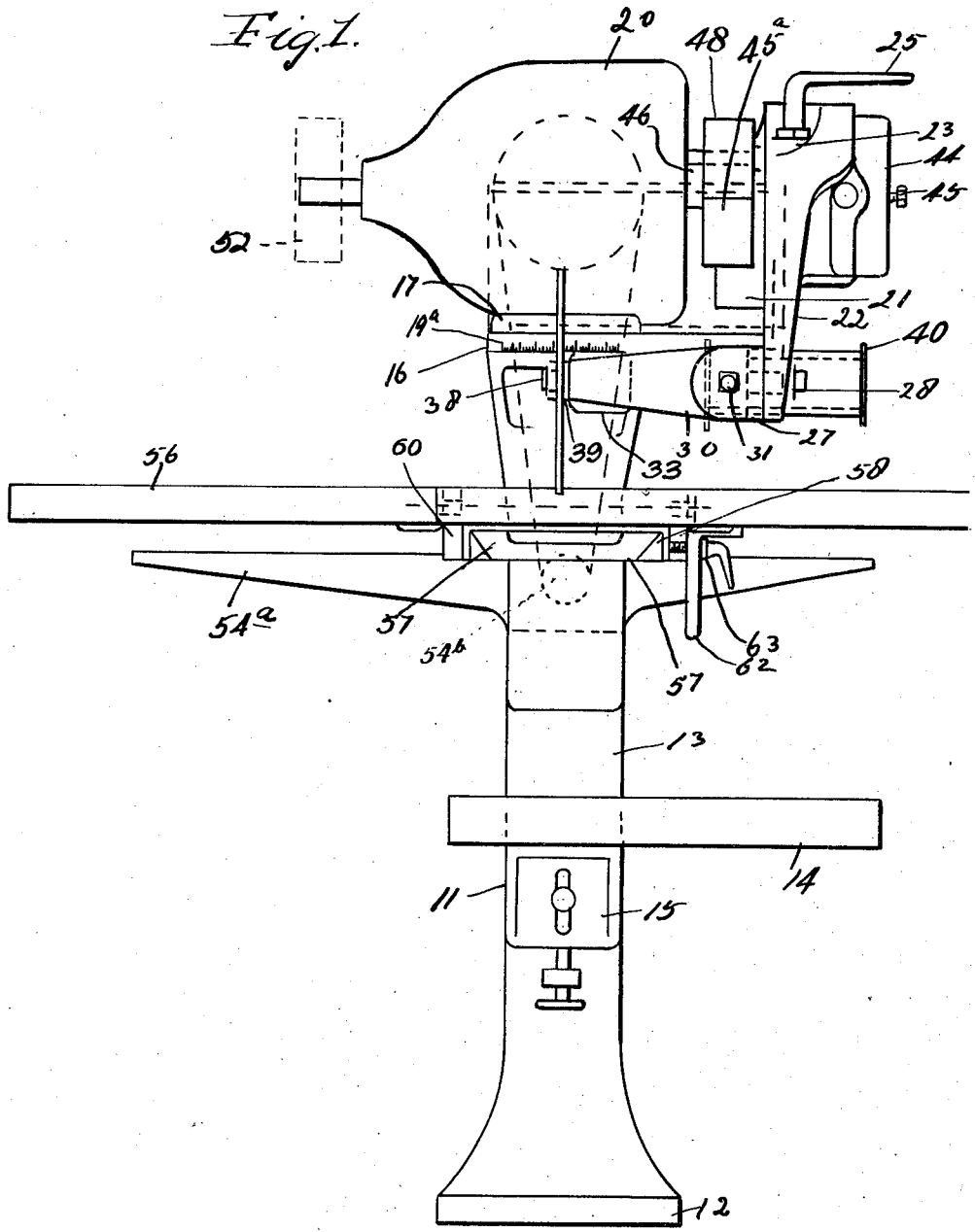
Figure 2:
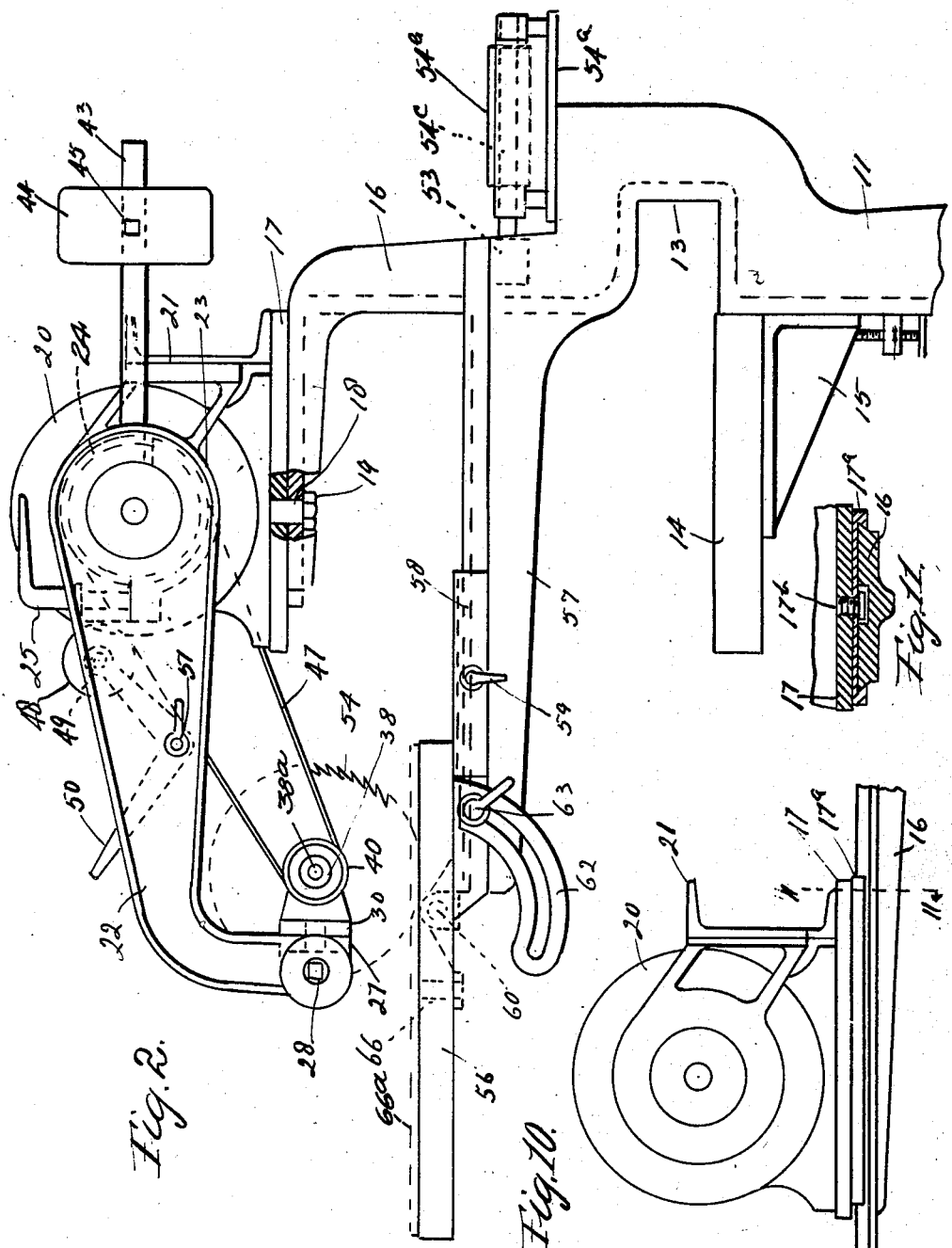
Figure 3:
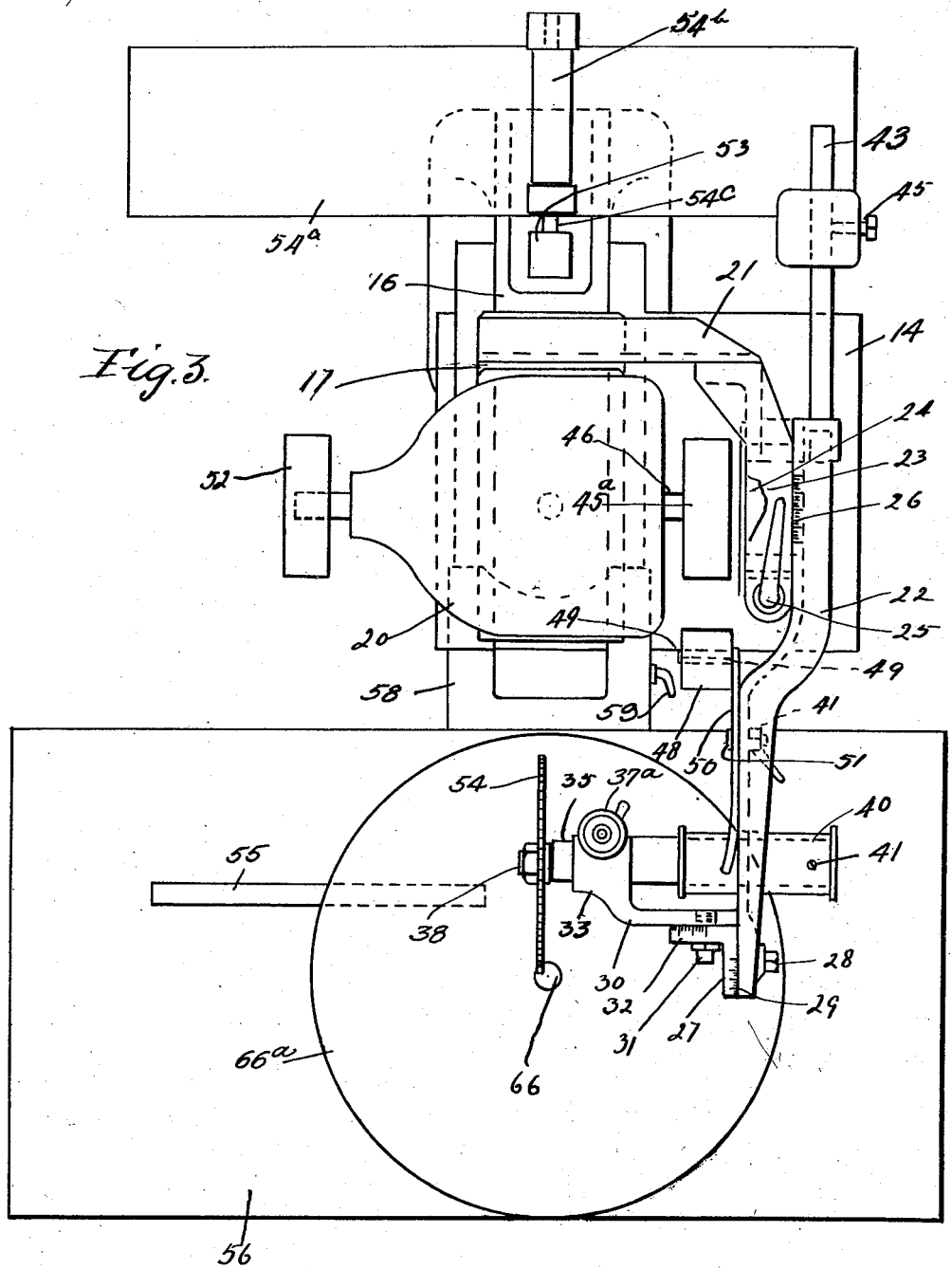

In carrying out my invention as here embodied, 11 represents a supporting standard having a suitable base 12, and the upper portion of the standard is off-set to form the gap 13 to give clearance for lumber or other material supported upon the table 14 for swing sawing or sawing off. This table is made rigid by the bracket 15.

16 represents an overhanging support projecting upward from the standard 11, and upon the horizontal portion of this support is pivoted the motor base 17, by means of the stud bolt 18, said stud having the nut 19 threaded thereon to clamp the base 17 in any adjustment as will be readily understood, the degree of such adjustment being indicated by the graduations 19$^a$; this base carries the motor 20.

21 represents a bracket for supporting the swinging arm 22, and this bracket is also carried by the motor base 17, and the outer end of said bracket terminates in a split bearing 23 in which is set the hub 24 of the swinging arm 22; the split bearing being provided with the clamp bolt 25 for holding the swinging arm in any adjustment, and the graduations 26 are so located as to indicate the angle at which this arm is set.

To the outer end of the swinging arm is adjustably secured the angle block 27 by the set bolt 28 in order that this block may be turned about this bolt as an axis and secured in any adjustment, the graduations 29 serving to indicate this adjustment. To the free end of the angle block is adjustably secured the arm 30 by the set bolt 31, the graduations 32 indicating the amount of adjustment of this arm.

33 represents the tool shaft box carried by the arm 30, and a portion of this box is split, as indicated at 34, and has adjustably set thereon the tool shaft bearing 35, and this bearing is provided with the gear teeth 36 with which meshes the pinion 37, fitted in said split portion, for the lengthwise adjustment of the bearing as and for the purpose hereinafter set forth.

Within the bearing 35 is rotatably mounted the tool shaft 38 carrying the collar 39 to prevent endwise movement in the bearing in one direction, while the hub of the pulley 40 prevents the movement of this shaft in the opposite direction. This pulley 40 is adapted to pass over the box 33 spaced therefrom, and to be secured upon its shaft by a suitable set screw 41 and key 42; and if desired, this tool shaft can be mounted in ball bearings.

Each end of the shaft 38 has a socket 38ª formed therein, and is also externally threaded, one end being preferably threaded right handed, while the other end is threaded left handed, and is thus adapted to receive the shanks of various kinds of tools upon either or both ends thereof.

In order that the swinging arm 22 and such tools and attachments as may be carried thereby may be counter balanced, a rod 43 projects rearward from this swinging arm, and has slidably mounted thereon the counterweight 44, which may be positioned in any adjustment upon the rod by the set screw 45; this arrangement facilitates the adjustment of the swinging arm and the tools carried thereby and tends to minimize the vibrations of the machine during the high speed operations.

45ª represents a pulley secured upon the motor shaft 46, and this pulley is in alignment with the pulley 40 so that a belt may connect these two pulleys; such belt being indicated at 47, and in order that this belt may be kept at the desired tension, an idler 48 is journalled upon the stud 49 carried by the outer end of the lever 50, which lever is adjustably secured to the inner face of the swinging arm by the set bolt 51, thus providing for the changing of the tension of the idler upon the belt.

Upon the rear end of the motor shaft 46 is also mounted a pulley 52 which may be swung over and in alignment with the pulley 53 carried by the planing attachment, by swinging the motor 90°, and said planing attachment consists of the table 54ª, having a cutter 54ᵇ mounted therein upon the shaft 54ᶜ. By this arrangement power is readily transmitted from the motor to the planer, and a workman may use the planer at the same time another workman is using a drill, tap or the like.

Figure 4:
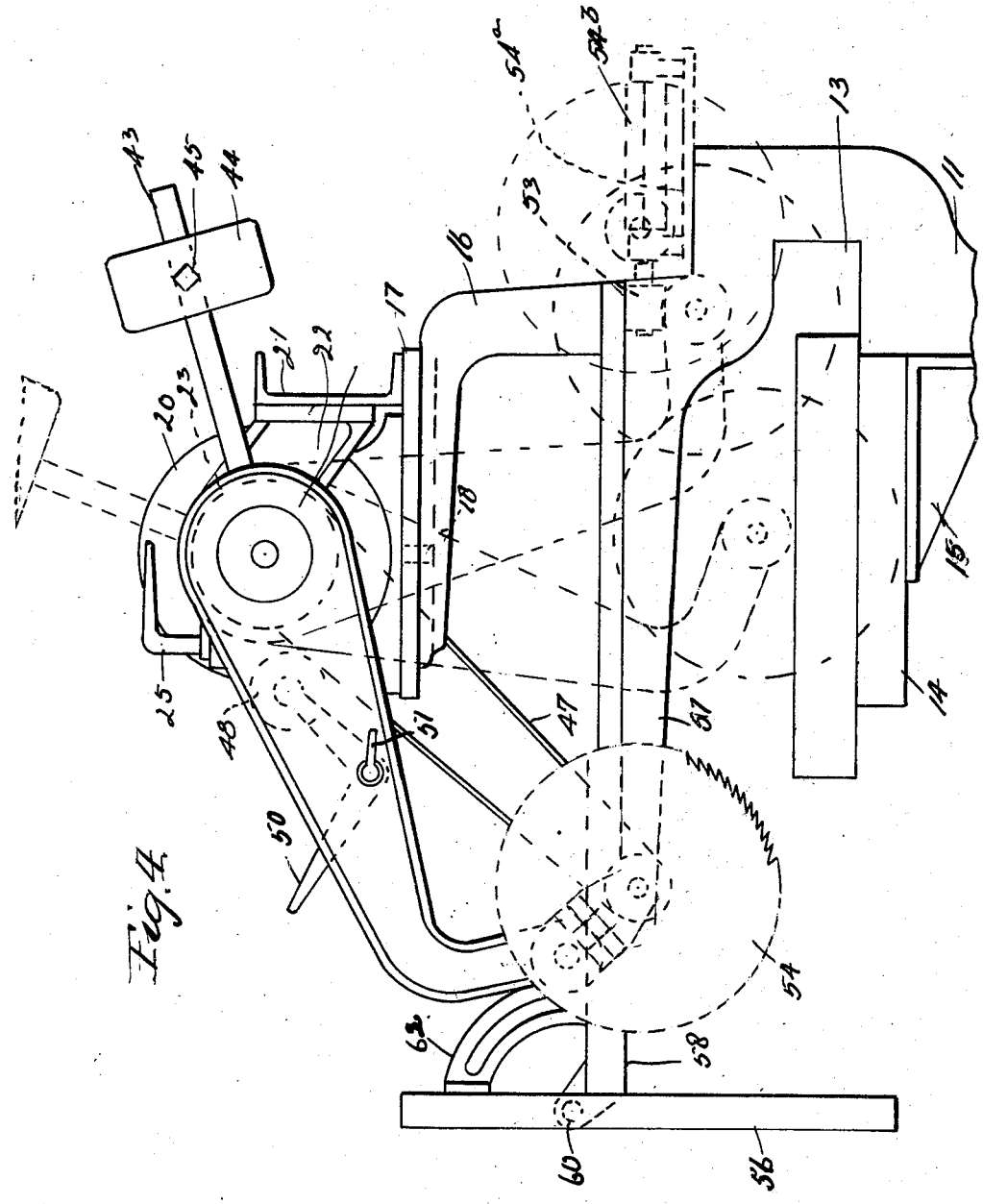

From the foregoing description it will be seen that various kinds of tools may be mounted upon either or both ends of the tool shaft 38, and these tools may be adjusted to any position at various angles by the universal joint, consisting of the angle block 27 and the set bolts coupling this block to the arm and the arm 30, so that should a saw be mounted upon this tool shaft, the same may be adjusted, and at the same time the swinging arm and all of the mechanism carried thereby may be turned or adjusted around the bolt 18, thus providing for mitering and other operations at a horizontal, vertical or any intermediate angle. Another use of the machine is illustrated in Fig. 4 where the saw is used for swing sawing or cutting off lumber supported upon the table 14, and when thus used, the arm 30 is turned 180 degrees, and the hub of the swinging arm is unclamped by the proper manipulation of the set bolt 25, so that the arm thereafter may be free to be so swung that the saw 54 will be carried through an arc sufficient to cut off the lumber. The various positions of the saw and swinging arm in this operation are indicated in dotted lines.

Another adjustment of the machine is shown in Fig. 5, where a horizontally adjusted saw is illustrated, as well as a spotting tool, the latter being shown in dotted lines at 65.

When the tool shaft 38 is adjusted to a vertical position as shown in Fig. 5, the belt indicated at 47 will of course be crossed to transmit power from the horizontal motor shaft to the tool shaft in this vertical position.

Likewise, when it is desired to adjust the machine for ripping lumber or other material, the swinging arm is turned to the position shown in Fig. 7, and rigidly adjusted at this point, the universal member consisting of the angle block 27 and arm 30 being so adjusted as to bring the saw indicated at 54 to the slot 55 in a table 56 from the underside of said table in order that boards or other material resting upon the table and forced lengthwise of the saw will be acted upon after the manner of an ordinary rip saw. By adjusting the saw at any desired angle, beveled edges may be cut when the machine is in the adjustment last described by tilting the work table 56.

For certain classes of work, it is desirable that the table supporting the lumber be movable, as hereinafter described, rather than the running saw should be moved across the lumber, and for this reason the machine is provided with an extended bracket 57 which is preferably cast with the standard, and extends forward therefrom; its upper surface and edges being adapted to receive and guide the shoe 58, which may be held in any adjustment upon the guide, by the clamp bolt 59. The outer end of the shoe 58 projects upward and has pivoted thereto at 60, the table 56, the underside of the table being provided with a slotted quadrant 62 through which the set bolt 63 passes and threads into the shoe for the purpose of holding the table in any adjustment, either its normal horizontal position or any tilted position, as will be readily understood.

66ª is a special turntable pivoted by bolt 66, easy to be adjusted for cross-cutting at angles. Turn table 66ª is easy to put on table 56 when needed.

When lumber or other material is placed upon a table thus constructed and arranged, this lumber may be readily passed beneath this saw 54 by sliding the table lengthwise of the guide bracket 57; thus providing for various sawing operations in a more accurate manner than where the tool carrying parts of the machine must be moved to accomplish the result. This form of table also provides for shaping, spotting and surfacing by adjusting the tool shaft to a vertical or any other position and using the proper tool for operations upon the material carried upon the bed.

When it is desired to change the speed of the tool shaft 38, this may be readily accomplished by securing the pulley 40ª shown in dotted lines in Fig 8 over the pulley 40, and by the addition of a sleeve pulley with different diameters, any desirable speed may be had for the tool shaft, within reasonable limitations.

The slight modification shown in Figs. 10 and 11 consists in swively mounting the motor base 17 upon the sliding block 17ª, and fitting this block to slide upon the overhanging arm 16 and providing a set bolt 17ᵇ for clamping the block 17ª in any desired adjustment or unclamping said block so that the motor base carrying the motor and swinging arm may be moved back and forth upon the arm 16, thus providing for the utilization of the various tools by bringing them into contact with the material being operated upon, the latter being placed upon the stationary table; this table also to be tilted.

It is to be noted that by the design and construction here shown that ample space is provided for the manipulation of the lumber in all directions.

Still another object of the design and construction of this machine is that when an electric current is not available, a belt may be run directly over the idler pulley 48 from any suitable power transmission above pulley 45, and from thence over the pulley 40.

As shown in Fig. 9, the pinion 37 may be revolved by the hand wheel 37ª to move the tool shaft bearing back and forth for boring work and adjusting the tool shaft, and this pinion and shaft bearing may be clamped in any adjustment by the setting up of the nut 37ᵇ, as will be readily understood.

By constructing a machine of this description in units, provision is made for various kinds of work, and a rigid, substantial, simple machine is produced at relatively small cost, yet of great utility in shop practice.

Of course I do not wish to be limited to the exact details of construction as herein shown as these may be varied within the limits of the appended claims without departing from the spirit of my invention.

Having thus fully described my invention, what I claim as new and useful is:

1. In a machine of the character described, a supporting standard; tables mounted upon said standard for supporting the work to be operated upon; a motor base swively mounted upon an extension of the standard; means for holding said base in any adjustment about its swivel point; a motor carried by the swivel base, said motor having a shaft; a pulley mounted upon said shaft; a bracket also mounted upon the swivel base; a split bearing carried by said bracket; a swinging arm having a hub adapted to fit within said split bearing, the center of said hub coinciding with the longitudinal center of the motor shaft; a tool shaft box universally adjustable attached to the outer end of the swinging arm, a bearing fitted within said box to have a longitudinal sliding movement therein; means for adjusting said bearing lengthwise and holding it in any adjustment; a tool shaft journalled in said bearing, said tool shaft being adapted to carry tools at each end thereof; a pulley secured upon said tool shaft; and means for transmitting power from the pulley on the motor shaft to the tool shaft pulley.

2. In a machine of the character described, a swivel base; means for adjusting and holding said base in any adjustment; a motor mounted upon said base; a bracket carried by the base, said bracket terminating in a split bearing; a hub fitted within said bearing; means for clamping the bearing upon the hub; an arm projecting from the hub; a universal joint carried by the free end of the arm; a tool shaft box carried by the universal joint; a tool shaft bearing fitted to slide longitudinally in the box; means for sliding said bearing; means for clamping the last named bearing in any position; a tool shaft journalled within the tool shaft bearing; and means for revolving said shaft at various spaces.

3. In a machine of the character described, a supporting standard; a base mounted upon the upper portion of said standard and adapted to be turned upon its center and clamped in any adjustment; a motor mounted upon the base, said motor having a shaft, the ends of which extend beyond the motor; a pulley rigidly secured upon the shaft; a bracket also mounted upon the motor base; a split bearing formed with the bracket; a hub fitted within said bearing, the center of which coincides with the actual center of the motor shaft; means to clamp the bearing on said hub carried by the hub; a tool shaft box mounted upon the outer end of the swinging arm so as to have a universal adjustment; a tool shaft bearing fitted within said box so as to have a lengthwise movement therein; a tool shaft journalled in said bearing; means for moving the bearing and shaft to and fro within the box; a pulley carried by one end of the tool shaft and adapted to be belted to pulley carried by the motor shaft.

4. In combination with the swinging arm of a machine of the character described, a universally adjustable tool shaft box mounted upon the free end of said arm; a bearing fitted within said box so as to be moved longitudinally therein; teeth formed upon said bearing; a pinion meshing with said teeth in such manner that the bearing may be moved longitudinally; a tool shaft mounted in the bearing; means for attaching tools to each end of said shaft; and a pulley mounted upon one end of the shaft for transmitting power whereby said shaft may be rotated by a running belt.

In testimoney whereof, I have hereunto affixed my signature.

EUGENE JAHN.